(12) United States Patent
Tischer

(10) Patent No.: US 11,653,043 B2
(45) Date of Patent: *May 16, 2023

(54) PAUSING AND RESUMING MEDIA FILES

(71) Applicant: AT&T Intellectual Property I, L.P., Atlanta, GA (US)

(72) Inventor: Steven N. Tischer, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/545,563

(22) Filed: Dec. 8, 2021

(65) Prior Publication Data

US 2022/0103875 A1 Mar. 31, 2022

Related U.S. Application Data

(63) Continuation of application No. 16/739,167, filed on Jan. 10, 2020, now Pat. No. 11,228,793, which is a (Continued)

(51) Int. Cl.
| | |
|---|---|
| *H04N 21/2387* | (2011.01) |
| *G11B 27/036* | (2006.01) |
| *G06F 16/44* | (2019.01) |
| *G11B 27/031* | (2006.01) |
| *G06F 16/78* | (2019.01) |

(Continued)

(52) U.S. Cl.
CPC ....... *H04N 21/2387* (2013.01); *G06F 16/447* (2019.01); *G06F 16/7867* (2019.01); *G11B 27/031* (2013.01); *G11B 27/034* (2013.01); *G11B 27/036* (2013.01); *G11B 27/322* (2013.01); *H04N 21/2353* (2013.01); *H04N 21/6587* (2013.01); *H04N 21/8455* (2013.01); *H04N 21/47* (2013.01)

(58) Field of Classification Search
CPC .......... H04N 21/2387; H04N 21/2353; H04N 21/6587; H04N 21/8455; H04N 21/147; G06F 16/447; G06F 16/7867; G11B 27/031; G11B 27/034; G11B 27/036; G11B 27/322

See application file for complete search history.

(56) References Cited

U.S. PATENT DOCUMENTS

| | | |
|---|---|---|
| 5,721,829 A | 2/1998 | Dunn et al. |
| 5,864,682 A | 1/1999 | Porter et al. |

(Continued)

FOREIGN PATENT DOCUMENTS

WO 2005050993 A9 8/2005

OTHER PUBLICATIONS

NISO, Understanding Metadata, NISO Press, 2004, 20 pages.

*Primary Examiner* — Tadesse Hailu
(74) *Attorney, Agent, or Firm* — Guntin & Gust, PLC; John G. Rauch

(57) ABSTRACT

Disclosed herein are systems and methods for the presentation and marking of media modules. In different aspects, the systems and methods may allow a user to present and consume a media module, particularly a media module containing data that is typically presented in a serial manner such as audio, visual, or video media, and to create a marked media module for quickly and easily returning to a marked point of interest in the media module at a later time or on a different device.

20 Claims, 5 Drawing Sheets

Related U.S. Application Data continuation of application No. 14/744,044, filed on Jun. 19, 2015, now Pat. No. 10,567,817, which is a continuation of application No. 13/415,888, filed on Mar. 9, 2012, now Pat. No. 9,092,438, which is a continuation of application No. 11/612,353, filed on Dec. 18, 2006, now Pat. No. 8,161,387.

(51) Int. Cl.
*G11B 27/034* (2006.01)
*G11B 27/32* (2006.01)
*H04N 21/235* (2011.01)
*H04N 21/6587* (2011.01)
*H04N 21/845* (2011.01)
*H04N 21/47* (2011.01)

(56) References Cited

U.S. PATENT DOCUMENTS

| | | | |
|---|---|---|---|
| 6,064,380 A | 5/2000 | Swenson et al. | |
| 6,289,346 B1 | 9/2001 | Milewski et al. | |
| 6,597,375 B1 | 7/2003 | Yawitz | |
| 6,868,225 B1 | 3/2005 | Brown et al. | |
| 6,868,403 B1 * | 3/2005 | Wiser | H04L 9/3271 |
| | | | 705/56 |
| 7,051,275 B2 | 5/2006 | Gupta et al. | |
| 7,103,906 B1 | 9/2006 | Katz et al. | |
| 7,257,774 B2 | 8/2007 | Denoue et al. | |
| 7,320,137 B1 | 1/2008 | Novak et al. | |
| 7,636,705 B2 | 12/2009 | Kim | |
| 7,830,570 B2 | 11/2010 | Morita et al. | |
| 7,853,564 B2 | 12/2010 | Mierau et al. | |
| 8,429,696 B2 | 4/2013 | Tecot et al. | |
| 2002/0069218 A1 | 6/2002 | Sull et al. | |
| 2002/0114613 A1 | 8/2002 | Thai | |
| 2002/0174430 A1 | 11/2002 | Ellis et al. | |
| 2003/0037068 A1 | 2/2003 | Thomas et al. | |
| 2003/0093801 A1 | 5/2003 | Lin et al. | |
| 2004/0061794 A1 | 4/2004 | Bodin | |
| 2004/0091235 A1 | 5/2004 | Gutta | |
| 2004/0143845 A1 | 7/2004 | Lin et al. | |
| 2004/0193648 A1 | 9/2004 | Lai et al. | |
| 2004/0223737 A1 | 11/2004 | Johnson | |
| 2005/0050578 A1 | 3/2005 | Ryal | |
| 2005/0094031 A1 | 5/2005 | Tecot et al. | |
| 2005/0097623 A1 | 5/2005 | Tecot et al. | |
| 2005/0125838 A1 * | 6/2005 | Wang | H04N 21/25875 |
| | | | 348/E7.071 |
| 2005/0166258 A1 | 7/2005 | Vasilevsky et al. | |
| 2005/0185557 A1 | 8/2005 | Inakura | |
| 2005/0210145 A1 | 9/2005 | Kim et al. | |
| 2005/0216840 A1 | 9/2005 | Salvucci | |
| 2005/0289236 A1 | 12/2005 | Hull et al. | |
| 2006/0089981 A1 | 4/2006 | Ahn et al. | |
| 2006/0095401 A1 | 5/2006 | Krikorian et al. | |
| 2006/0242161 A1 | 10/2006 | Ten et al. | |
| 2007/0055986 A1 | 3/2007 | Gilley et al. | |
| 2007/0078898 A1 | 4/2007 | Hayashi et al. | |
| 2007/0124331 A1 | 5/2007 | Griffin | |
| 2007/0150930 A1 | 6/2007 | Koivisto et al. | |
| 2007/0157072 A1 | 7/2007 | Labiche | |
| 2007/0266399 A1 | 11/2007 | Sidi | |
| 2007/0276852 A1 | 11/2007 | Fletcher | |
| 2008/0031210 A1 * | 2/2008 | Abhishek | H04W 8/005 |
| | | | 370/338 |
| 2008/0039051 A1 * | 2/2008 | Stalin | H04L 51/066 |
| | | | 455/412.1 |
| 2008/0052698 A1 * | 2/2008 | Olson | G06F 8/658 |
| | | | 717/168 |
| 2008/0126919 A1 | 5/2008 | Uskali et al. | |
| 2008/0250061 A1 | 10/2008 | Kim | |
| 2009/0282444 A1 | 11/2009 | Laksono et al. | |

\* cited by examiner

PAUSING AND RESUMING MEDIA FILES

CROSS-REFERENCE TO RELATED APPLICATIONS

This application is a continuation of U.S. patent application Ser. No. 16/739,167 filed on Jan. 10, 2020, pending, which is a continuation of U.S. patent application Ser. No. 14/744,044, filed Jun. 19, 2015, issued as U.S. Pat. No. 10,567,817, which is a continuation of U.S. patent application Ser. No. 13/415,888, filed Mar. 9, 2012, issued as U.S. Pat. No. 9,092,438, which is a continuation of U.S. application Ser. No. 11/612,353, filed Dec. 18, 2006, issued as U.S. Pat. No. 8,161,387. All sections of the aforementioned applications and patents are incorporated herein by reference in their entirety.

TECHNICAL FIELD

Disclosed herein are systems and methods for the presentation and marking of media modules.

BACKGROUND

Most media modules, such as audio, visual, and video media, are presented to and consumed by a user in a linear fashion. The user typically starts from some beginning point of the media and proceeds through to some end point. If the user is interrupted or desires to pause the presentation at some point of interest, the presentation may be temporarily halted on the device displaying the media presentation. If the media is in a form that is capable of being paused, such as a video or audio tape or other storage medium, the user may resume the presentation on a second device by removing the tape or other storage medium, and placing it in the second device. For analog content, such as a cassette tape, the storage media may be stopped automatically at the point of interest when the user pauses the presentation. However, for digital content, the storage media is typically not stopped automatically at the point of interest, and the user may face the prospect of fast forwarding or scanning through the digital media or a copy of the media to locate the particular point of interest.

SUMMARY

Embodiments of the present disclosure include systems and methods for creating a marked media module. For example, disclosed herein is one or more computer readable media comprising executable instructions that, when executed, direct software to create a marked media module to mark a point in the presentation of a media module presented on a first media presentation device, and access the marked media module to present a marked form of the media module on a second media presentation device or on the first media device at a later time.

Other embodiments of the present disclosure include systems for creating a marked media module. One such system may include a marking module to mark a point or plurality of points in the presentation of a media module by creating a marked media module; and a media presentation module to access the marked media module and to present a marked form of the media module from a point corresponding to the point marked with the marked media module.

Other systems and methods according to embodiments will be or become apparent to one with skill in the art upon review of the following drawings and detailed description. It is intended that all such additional systems and methods be included within this description, be within the scope of the present disclosure, and be protected by the accompanying claims.

DETAILED DESCRIPTION

Systems and methods for creating a marked media file will now be described with more particularity and with reference to the drawings.

Personal Consumption Mode

According to a first implementation, various tools and techniques described herein may present a media module to a user, and may enable the user to consume the media module. The media module may contain data that is typically presented in a serial manner, such as audio, visual, or video media. Additionally, the tools and techniques may create a marked media module for enabling the user to quickly and easily return to a marked point of interest at a later time. The marked media module may be a marker, plurality of markers or modified version of the original media module and may be shared with other devices or other users. The original user and consumer of the media module, i.e. the person who created the marked media module, may control the original presentation of the media content. Thus, this implementation may be referred to as a "personal consumption mode." As described in more detail below, the personal consumption mode may allow a user to share a marked media module between devices for which that user is registered. The personal consumption mode may also allow the user to share one or more marked media modules with selected users. The personal consumption mode will now be described with more detail, and by way of example, with reference to FIGS. 1 and 2.

Figure 1:
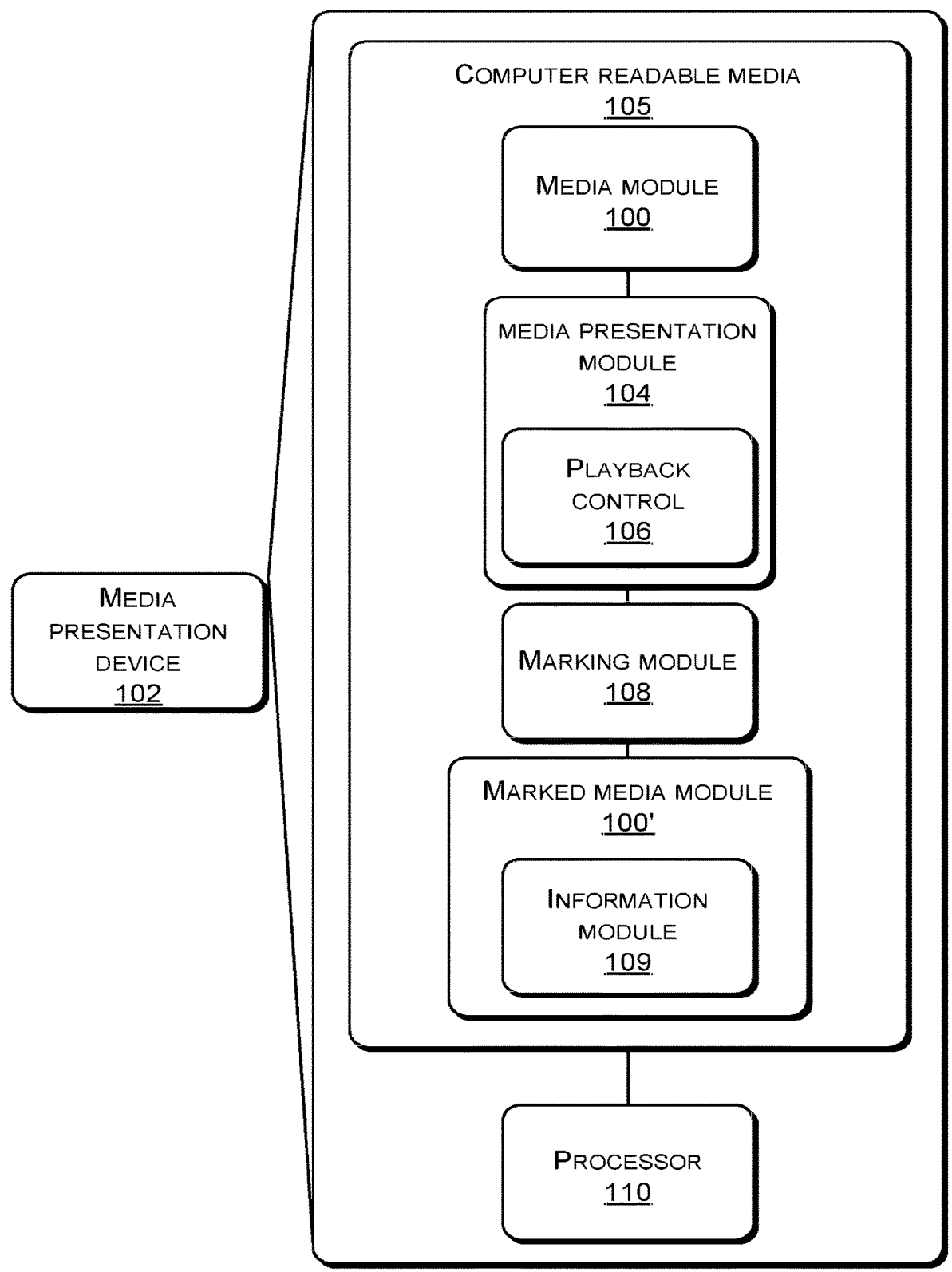
FIG. 1 shows a computing device having a media module, media presentation module, and marking module for presenting and marking a media module.

As shown in FIG. 1, a media presentation device 102 may present a media module 100 to a user through a media presentation module 104. The media module 100 may reside within computer readable media 105 and may contain audio, visual, or video content or any other form of serially consumable media content or the like and may be digital or analog in nature. For example, the media module 100 may be a video file in digital format, such as a movie file. The movie or video file may be a Moving Pictures Experts Group (MPEG) file, e.g. MPEG-1, MPEG-2, MPEG-4, MPEG-7, MPEG-21; or other file, such as those commonly referred to as a Quicktime format (MOV), Audio Video Interleave (AVI), and Windows Media Video (WMV) files. The media module 100 may alternatively be an audio file such as those commonly referred to as MPEG layer 3 (MP3), Waveform audio format (WAV), Ogg format (OGG), Windows Media Audio (WMA), and Musical Instrument Digital Interface (MIDI) file. These lists are exemplary only and are not intended to be exhaustive or exclusive.

The presentation module 104 may include a media presentation software application, firmware, or the like. The media presentation module 104 may be transparent to the user or may incorporate user interaction. The media presentation module 104 may be located on computer readable media 105 or may be accessed remotely by the media presentation device 102. The media presentation module 104 may have playback control 106 to allow the user to control the presentation of the media module 100. Thus, continuing with the digital video example, the media presentation module 104 may be a video player software application (hereafter "video player"). The media presentation module 104 may have the playback control 106, which may provide the user with the following functions: "play," "stop," "pause," "fast forward," "reverse," "jump to," "time lapse bar" or other control.

The media presentation device 102 may be any device that is operable to present the media module 100 to a user through the presentation module 104 located on the computer readable media 105 and connected to the processor 110. For example, the media presentation device 102 may be a desktop or laptop computer, audio playback device (e.g. an mp3 player), text display device, cellular telephone, personal digital assistant (PDA) or other handheld device, digital camera, television monitor, gaming console, wristwatch display, or the like.

The computer-readable media 105 may include a marking module 108 that creates a marked media module 100', so that the presentation may be resumed relative to the point at which an interrupt occurred previously, or at any other point of interest. In possible implementations, the marking module 108 may perform these functions in response to user command or input. The marking module 108 may be incorporated with or independent of the media presentation module 104. For example, the marking module 108 may be presented to and accessed by the user through the media presentation module 104. Alternatively, the marking module 108 may be a separate application, program, or algorithm from presentation module 104, with the marking module 108 operating in conjunction with the presentation module 104 to create the marked media module 100'.

The marked media module 100' may be a modified form of the original media module 100 in which one or more marked points may be easily accessed without scanning through the media to locate the marked point. The modified media may have an indicator that prompts the media presentation module 104 or a similar media presentation module to resume presenting marked media module 100' from the marked point. Alternatively, the marked media module 100' may include one or more markers or place identifiers created and stored as data. This data may be used with the original or another copy of the media module 100 to locate the specific point in the media module 100 to which the marker refers.

If the marked media module 100' is a modified form of the original media module 100, any unwanted portion of original media module 100 may be discarded. For example, a portion already presented to and consumed by the user, or unwanted by the user, may be discarded or "cropped." Alternatively or additionally, the user may wish to discard media that would be presented in a serial manner at some point after the reference point. One example would be the originally presented media module 100 in which the user knows that only a certain portion of the media module 100 will be consumed relative to a particular mark. The marking module 108 may crop the portion of the content of media module 100 already viewed as well as a portion of the content at some point after the marked point.

As a more particular example, assume that a user is viewing a video media file that is 2 hours in length, and that the user wishes to mark the media at a given point 30 minutes into the video. If the user knows that the last 60 minutes are of no interest, the user may request that the marking module 108 create a marked media module 100' that may start from the marked point at 30 minutes into the video and may end 60 minutes from the end of the video.

Similarly, when media is presented serially, but divided into chapters, the user may desire to consume only one or several chapters, beginning with the marked point. The user may request that the marking module 108 create a marked media module, such as the marked media module 100', comprising media resuming from the reference point through the end of the chapter or including as many additional chapters as desired. Creating a cropped version of the media module 100 may reduce the size of the marked media module 100', in terms of length and bytes of data, as the user consumes the media. Additionally, by creating a cropped version of the media module 100, in which the marked media file starts from the mark, the marking module 108 may enable the user to more easily resume from the marked point, rather than having to search for the marked point.

The marked media module 100', whether a modified version of the original media module or a separate marker, may contain or be associated with an information module 109. For example, the information module 109 may indicate information such as who created the marked media module 100', what content is contained in and/or marked by the marked media module 100', source descriptor information, media format information, the marked media module 100' creation date (e.g. timestamp, point during the presentation at which the marker was created, etc.), and/or other descriptive information (original presentation device information, etc.). If the media module 100 and/or the marked media module 100' are digital in nature, the marked media module 100' may refer to the marked point as a single byte of information or it may reference multiple bytes or a block of information, such as a chapter of a book or video, or even a particular page of a written text.

The marked media module 100' may then be saved for future presentation on the presentation device 102. The marked media module 100' may be stored on a central storage module for retrieval by the original media presentation device or other media presentation devices, or for resumption on another media presentation device, as will be described in further detail below with regard to the personal consumption mode implementation shown in FIG. 2. The example shown in FIG. 2 will be described with regard to video media, though it is intended that the media could be in an audio, visual, or other media format.

1. Presentation of Media Module

Figure 2:
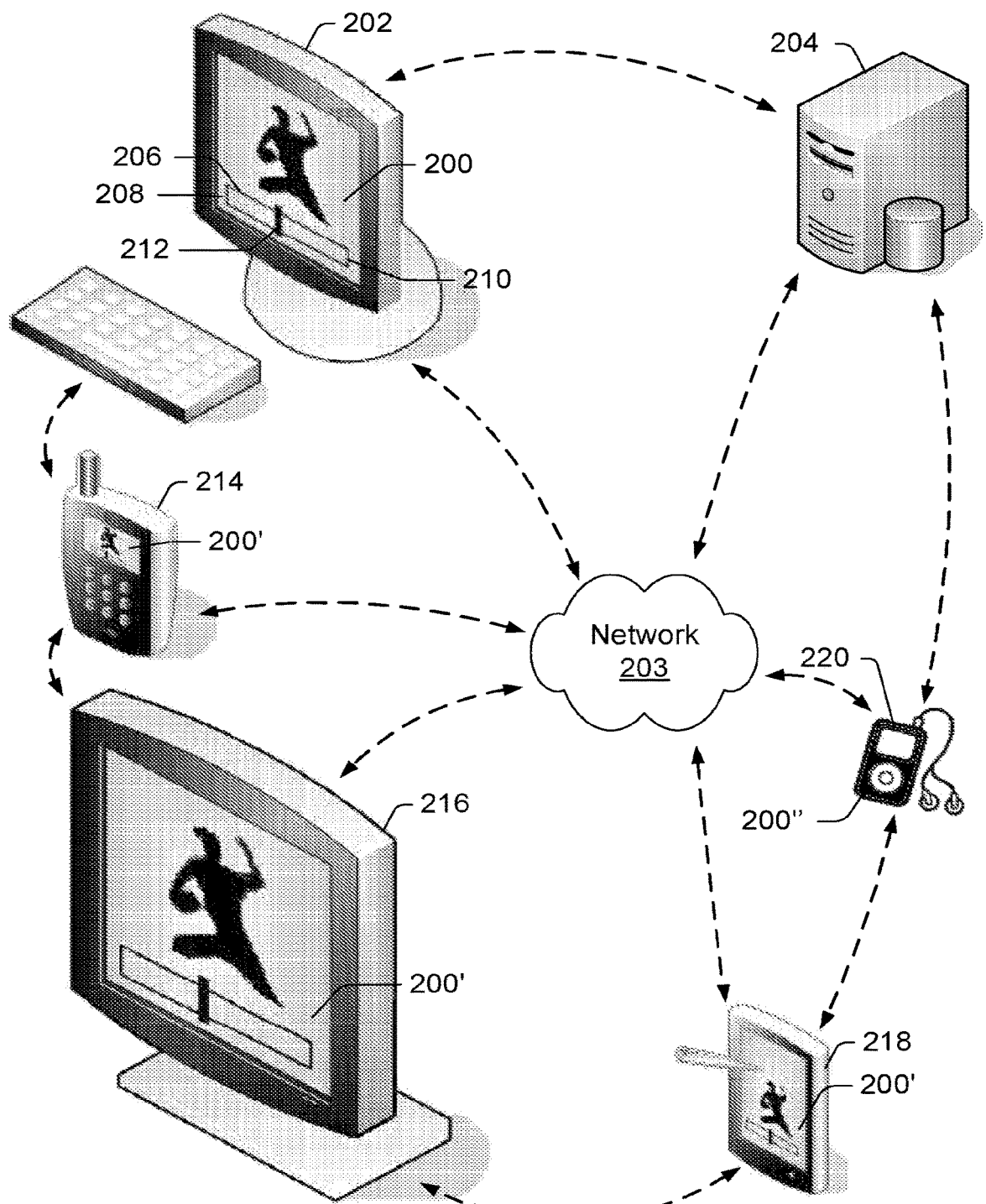
FIG. 2 shows a system for presenting a media module on a first media presentation device, creating a marked media module on the first media presentation device and sending the marked media module to media presentation devices and/or media storage devices.

According to the implementation shown in FIG. 2, the media module is a video 200 presented using video presentation software on a computer 202 so that a user may watch, listen, and otherwise experience the video 200. The video 200 and the video presentation software may originally reside on the computer 202. The computer 202 may be connected through a network 203, such as the Internet, to a storage server 204. This server 204 may be accessible only by a certain user, or may be made accessible to one or more other users. Thus, the video 200 and/or the video presentation software may alternatively be stored on the storage server 204 and/or accessible to the computer 202.

2. Consumption Interruption

The user may consume the media, such as the video 200, in a serial manner, but an interrupt may occur at some point during the presentation. For example, the user may pause or stop the video 200, intending to resume playing the video from the paused point at a later time. In such an instance, the user may desire to mark the video 200 at a certain point and resume from that point. For convenience, this mark may be generally shown in FIG. 2 using a time lapse bar 206. A first side 208 of the bar 206 refers to the starting point of the video 200. A second side 210 of the bar 206 refers to the end point of the video 200, or to the end point of a selected portion of the video 200, such as a chapter or scene. A marked point 212 may illustrate that the video 200 may have progressed to the point at which the user desires to create the mark. It should be noted that the bar 206 is provided to illustrate the serial nature of the presentation of the video 200, and to show that the video 200 has progressed to some specific point during the presentation. However, the presentation module and presentation device need not display any such time lapse bar 206.

3. Creation of Marked Media Module

The user may request that the marking module 108 create one or more marks with respect to the media module 100 at any desired point. For example, the user may desire to pause or stop the media presentation, and to resume the presentation of the media from the stopped point at a later time. The mark may be created in response to voice, keystroke, or other input, such as input from an input device. The user may request that the marking module 108 manually or automatically create a marked form of the originally presented media content. The marked media may be a modified form of the original media module, or may be a marker consisting of data that allows the user to return to the marked point. In some instances, if the marked media file is a modified form of the original media module, the modified media module may replace the original media module. In other instances, the marked media file may be saved or stored as a new module, so that the originally presented media module may be retained in its original form.

With reference to FIG. 2, the marked video 200' may be a copy or version of the video 200, with a marked point, such as the marked point 212, inserted in the media. Other marked points may similarly be created and included in the marked video 200'. The modified video module 200' may include an indicator that prompts the media presentation module 104 located on computer 202 or other device to resume from the mark 212 or other mark. Additionally or alternatively, any unwanted portion of the video 200 may be discarded. For example, the portion already viewed and consumed by the user may be "cropped" as described above.

Additionally, instead of copying or duplicating the original video 200, the marked video module 200' may include one or more markers or place identifiers. The marked video module 200' as a marker or plurality of markers may include information regarding the marked point 212, i.e. the media format, content, and location of the marked point 212 in the video 200, etc. Such a marker may be used with the original or another copy of the video 200 to locate the marked point 212 in the video 200. Creating the marked video module 200' as a marker or plurality of markers minimizes the size of the marked video module 200' by not including any content of the video.

4. Storing/Sending/Accessing the Marked Media Module

The marked video module 200' may be saved on the computer 202, sent to the storage server 204 for retrieval by the computer 202 or by other media presentation devices, or it may be sent directly to another media presentation device. For example, the marked video module 200' may be stored in the storage server 204 that may be accessible to a cellular phone 214, a display 216, a handheld device 218 or any other device capable of presenting video media. The original user or another authorized user may then retrieve the marked module 200' for presentation or consumption. The user may locate and/or retrieve the marked video module 200' using a search engine or other searching module.

Alternatively or additionally, the marked video 200' may be sent directly to one or more of the devices 214, 216, 218, or the like. Thus, if a user were viewing the video 200 on the computer 202, the user may request that the marking module 108 mark the video 200 to create the marked video module 200' and send the marked video 200' to, for example, the handheld device 218 so that the video 200' could continue to be viewed while the viewer was away from the computer 202. The operation of sending may be accomplished through a communication cable, such as a Universal Serial Bus (USB) cable, through a wireless connection, or other suitable communication connection.

In the event that the marked media module takes the form of a user-created marker or markers referencing a media module, such as the video 200, the user may use the computer 202 or other media presentation device together with the marker to locate the video 200, or a copy of the video 200. The user may additionally or alternatively use the computer 202 or other media presentation device together with the marker to locate the marked point 212 in the video 200. The marker or a media presentation module, such as the media presentation module 104 in FIG. 1, may be configured to commence presentation of the video 200 starting at the marked point 212 based on information contained in the marked media module. Creating a marked media module as a marker or plurality of markers that do not modify the video 200 may result in a marked media module that is relatively small in size, as it contains little or no video content, but may be combined with any copy of the video 200 stored in any location. Additionally, due to its relatively diminutive size, a marker or markers may be more easily shared between devices and/or users than a modified form of the original media.

In addition to, or as an alternative to, storing the marked video 200' on the original presentation device, such as the computer 202, the marked video 200' may be stored in the storage server 204 accessible by one or more other users and/or devices. The one or more users and/or devices may request retrieval of the marked video 200' from the storage server 204 in order to present the marked video 200'. For example, the marked video 200' may be accessed by the handheld device 218 through the network 203, which may have wired or wireless components. The user of the device 218 may search through the network 203 using a search engine to locate the storage server 204 and/or specifically the marked video 200'. The marked video 200' may be presented together with other marked media modules so that users may select one or more media modules for presentation and consumption.

In some instances, the marked video 200' (or marker referring to video 200) may be available to other users through the network 203. In such an instance, the user who originally consumed and created the marked video 200' may notify one or more other users of the location and/or other identifying and descriptive characteristics of the marked video 200' (or marker referring to the video 200). The one or more users may obtain access information to access the marked video 200'.

The marked media module 200' may additionally be converted from one media format to another. For example, the video 200 may be converted to a corresponding audio presentation. Thus, a user watching the video 200 on the computer 202 may request that the marking module 108 create a marked audio version 200" of the video 200 and send it directly, or indirectly, to an audio media presentation device, such as a hand-held personal audio device 220. The user may then consume the media in an audio form commencing from a point coinciding with the marked point 212 created with respect to the video 200. This conversion may be performed by translating the marked point 212 in the video 200 to a corresponding point in a corresponding audio file or to the audio content of the video 200.

Public Consumption Mode

According to another implementation, various tools and techniques described herein may be used to create a reference point on a marking device to mark a point of a media module being presented on a media presentation device. The media module may contain data that is typically presented in a serial manner, such as audio, visual, or video media. A reference point creation module may enable a user to create a reference point on the marking device. A reference point correlation module may correlate the reference point on the marking device to a point of the presentation of the media module. A presentation module may enable the user to continue presentation of the media module or of a modified form of the media module by utilizing the reference point. The device originally presenting the media module may present the media module to the public and may or may not be controlled by the user controlling the reference point creation device. Therefore, this implementation may be generally referred to as a "public consumption mode." The public consumption mode will now be described with more detail, and by way of example, with reference to FIGS. 3, 4, and 5.

Figure 3:
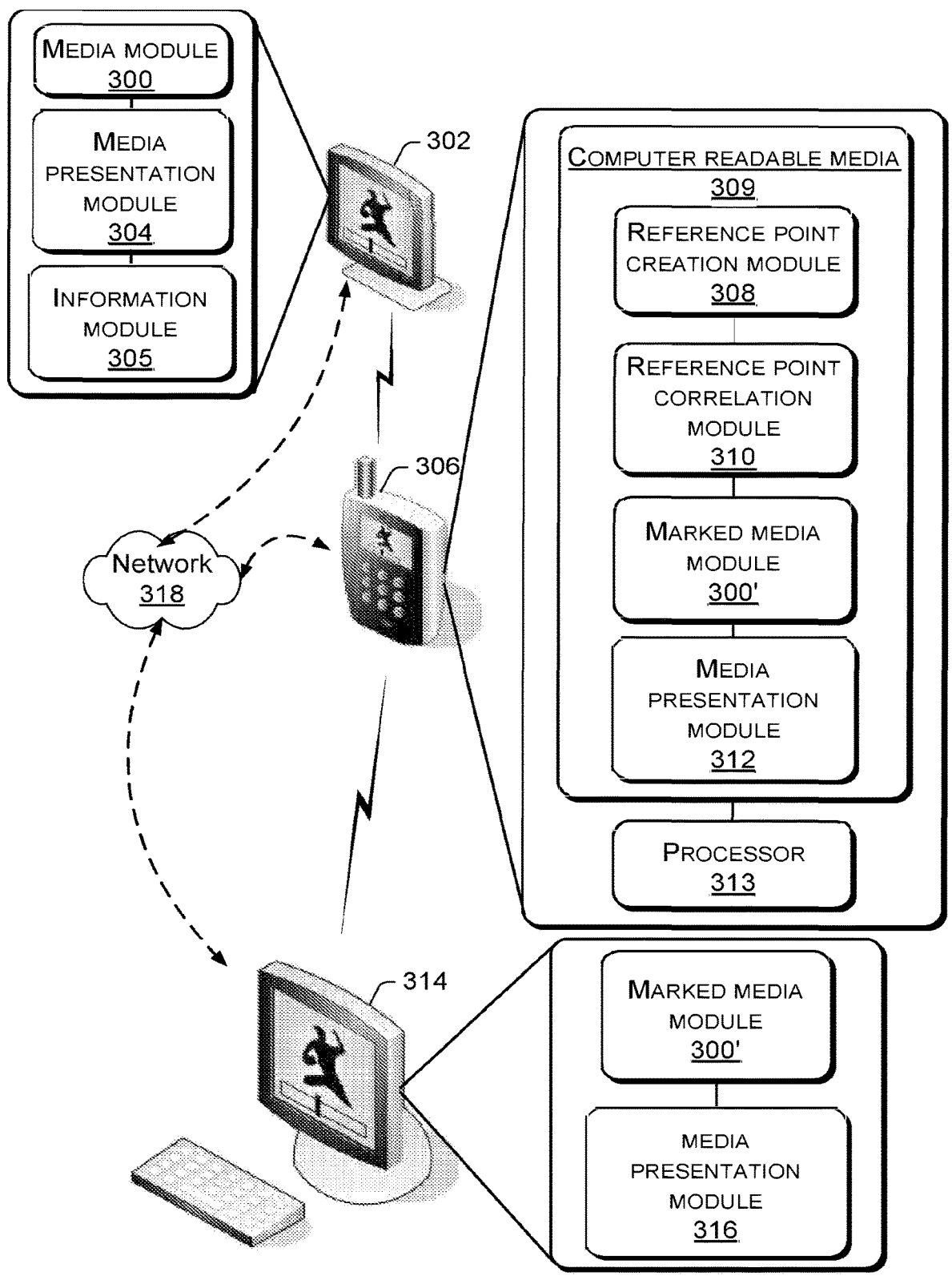
FIG. 3 shows a system for presenting a media module on a first media presentation device, creating a reference point on a reference point recordation device and resuming presentation of the media module on the reference point recordation device, which is a second media presentation module, using the reference point to resume the presentation from a marked point that corresponds to the point at which the reference point was created.

According to the implementation shown in FIG. 3, a system is illustrated for creating a reference point relative to the presentation of a media module 300. A first media presentation device 302 may present the media module 300 through a media presentation module 304. The media module 300 may contain audio, visual, or video content or any other form of serially consumable media or the like and may be digital or analog in nature. For example, the media module 300 may be a video file in digital format, such as a Moving Pictures Experts Group (MPEG) file, e.g. MPEG 4-MPEG 7-MPEG 21, or a so-called ".mov" file. An information module 305 may contain information regarding the media module 300, such as media content, presentation information, source information, set list or other descriptive information.

The media presentation device 302 may be any device that is operable to present the media module 300 to a user and/or a public audience through the media presentation module 304. For example, the media presentation device 302 may be a television monitor, desktop or laptop computer, video display device, audio playback device (e.g. an mp3 player), text display device, cellular telephone, personal digital assistant (PDA) or other handheld device, digital camera, gaming console, or the like.

The media presentation module 304 may be a media presentation software application, firmware, or the like for presenting the media module 300. The media presentation module 304 may be transparent to the user or may incorporate user interaction. The media presentation module 304 may be located on, in, or accessed by the media presentation device 302.

The media presentation device 302 may present the media module 300 to a user. The user may or may not have any control over the media presentation device 302. In other words, the user may actively interact with the media presentation device 302 or the user may merely passively interact by consuming media presented on the media presentation device 302.

A marking device 306 may, but need not, be a media presentation device. The marking device 306 may be any device that is operable to create a reference point using a reference point creation module 308. The reference point creation module 308 may be located on a computer readable media 309 and connected to a processor 313 installed on the marking device 306. The reference point may be a timestamp or other data that can be used for determining the point in the media module 300, for which the reference point was created. The reference point creation module 308 may be a software application, program, or algorithm or the like.

A reference point correlation module 310 may enable a user to determine at what point during the presentation of the media module 300 on the presentation device 302 the user created the reference point. For example, in the instance when a user creates a timestamp using the reference point creation module 308, the reference point correlation module 310 may enable the user to identify the media module 300 being presented on the media presentation device 302 and to determine the point in the media module 300 that was presented at the time that the timestamp was created. The reference correlation module may use this information to create a marked media module 300'. The reference point correlation module 310 may be a software application, program, or algorithm and may be located on the marking device 306, as shown in FIG. 3.

The marking device 306 may communicate with the media presentation device 302 and may retrieve or access the information module 305 from the media presentation device 302 in creating the reference point or in correlating the reference point to the media module 300 being presented on the media presentation device 302. Any or all of the devices 302, 306, and/or a device 314 may be communicatively coupled either directly (e.g. through a wired or wireless connection) or through a network 318, such as the Internet.

Figure 4:
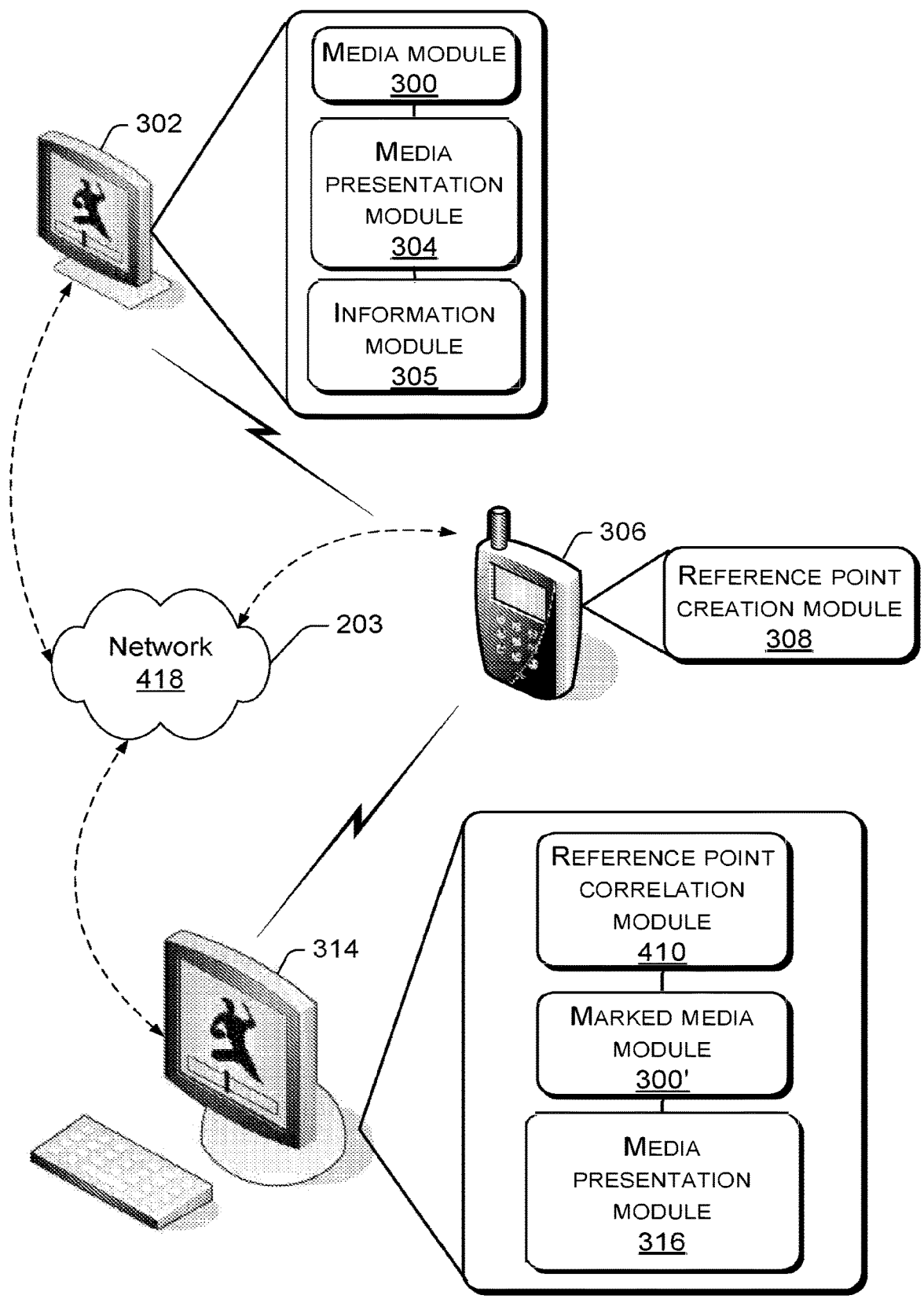
FIG. 4 shows a system for presenting a media module on a first media presentation device, creating a reference point on a reference point recordation device and resuming presentation of the media module on a second media presentation module, which is not the reference point recordation device, using the reference point to resume the presentation from a marked point that corresponds to the point at which the reference point was created.

As shown in FIG. 4, a reference correlation module 410 may additionally or alternatively be located on the media presentation device 314. In such an instance, the correlation between the reference point and the point during presentation of the media module 300 desired to be marked could be performed on the media presentation device 314. The media presentation device 314 may communicate with the media presentation device 302 and/or the marking device 306 directly or through a network 418.

Once the correlation is complete, the marked media module 300' may be presented relative to the reference point. The presentation may be resumed on the device 306 if that device is a media presentation device equipped with a media presentation module 312. Additionally or alternatively, the marked media module 300' may be sent to another media presentation device, such as the computer 314.

The marked media module 300' may be a modified form of the original media module 300 so that the marked point may be accessed without the user scanning through the media content to locate the marked point. The marked media 300' may be provided with an indicator that prompts the media presentation module 312 associated with the device 306 or a media presentation module 316 associated with the media presentation device 314 to resume from the marked point or that allows the user to otherwise jump to the marked point. Alternatively, the marked media module 300' could be a marker or place identifier relatively independent of the media module 300. More particularly, the marker may be created and stored as data on the device 306 and/or the device 314 to be used with the original or another copy of the media module 300 to locate the specific point in the media module 300 to which the marker refers.

If the marked media module 300' is a modified form of the original media module 300, any unwanted portion of the original media module 300 may be discarded. For example, a portion already presented to and consumed by the user, or unwanted by the user, may be discarded or "cropped." Alternatively or additionally, the user may wish to discard media that would be presented in a serial manner at some point after the reference point. One example would be the originally presented media module 300 in which the user knows that only a certain portion of the media module 300 will be consumed relative to a particular mark. The user may crop the portion of the content of the media module 300 already viewed as well as a portion of the content at some point after the reference point.

As a more particular example, assume that a user is viewing a video media file that is 2 hours in length, and that the user wishes to mark the media at a given point 30 minutes into the video. If the user knows that the last 60 minutes are of no interest, the user may request that the reference point correlation module 310 create the marked media module 300'. This marked media module 300' may start from the marked point at 30 minutes into the video and may end 60 minutes from the end of the video.

Similarly, when media is presented serially, but divided into chapters, the user may desire to consume only one or several chapters beginning with the marked point. The user may create the marked media module 300' comprising media resuming from the reference point through the end of the chapter or including as many additional chapters as desired. Cropping the media module 300 or creating a cropped copy of the media module 300 may reduce the size of the media module 300', in terms of length and bytes of data, as the user consumes the media. Cropping the media module 300 at the marked point, may allow the user to more easily resume from the marked point rather than having to search for or jump to the marked point.

The marked media module 300', whether a modified version of the original media module or a separate marker, may contain or be associated with descriptive information. For example, the marker may indicate information such as who created the marked media module 300', what content is contained in and/or marked by the marked media module 300', source descriptor information, media format information, mark creation date and time (e.g. timestamp, point during the presentation at which the marker was created, etc.), and/or other descriptive information. If the media module 300 and/or the marked media module 300' are digital in nature, the marked media module 300' may refer to the reference point as a single byte of information or it may reference multiple bytes or a block of information, such as a chapter of a book or video, or even a particular page of a written text.

The marked media module 300' may be saved for future presentation on the marking device 306, on the media presentation device 314 or on a central storage module for retrieval by or other media presentation devices, or on another media presentation device, as will be described in further detail below with regard to the public consumption mode implementation shown in FIG. 5.

1. Presentation of Media Module

Figure 5:
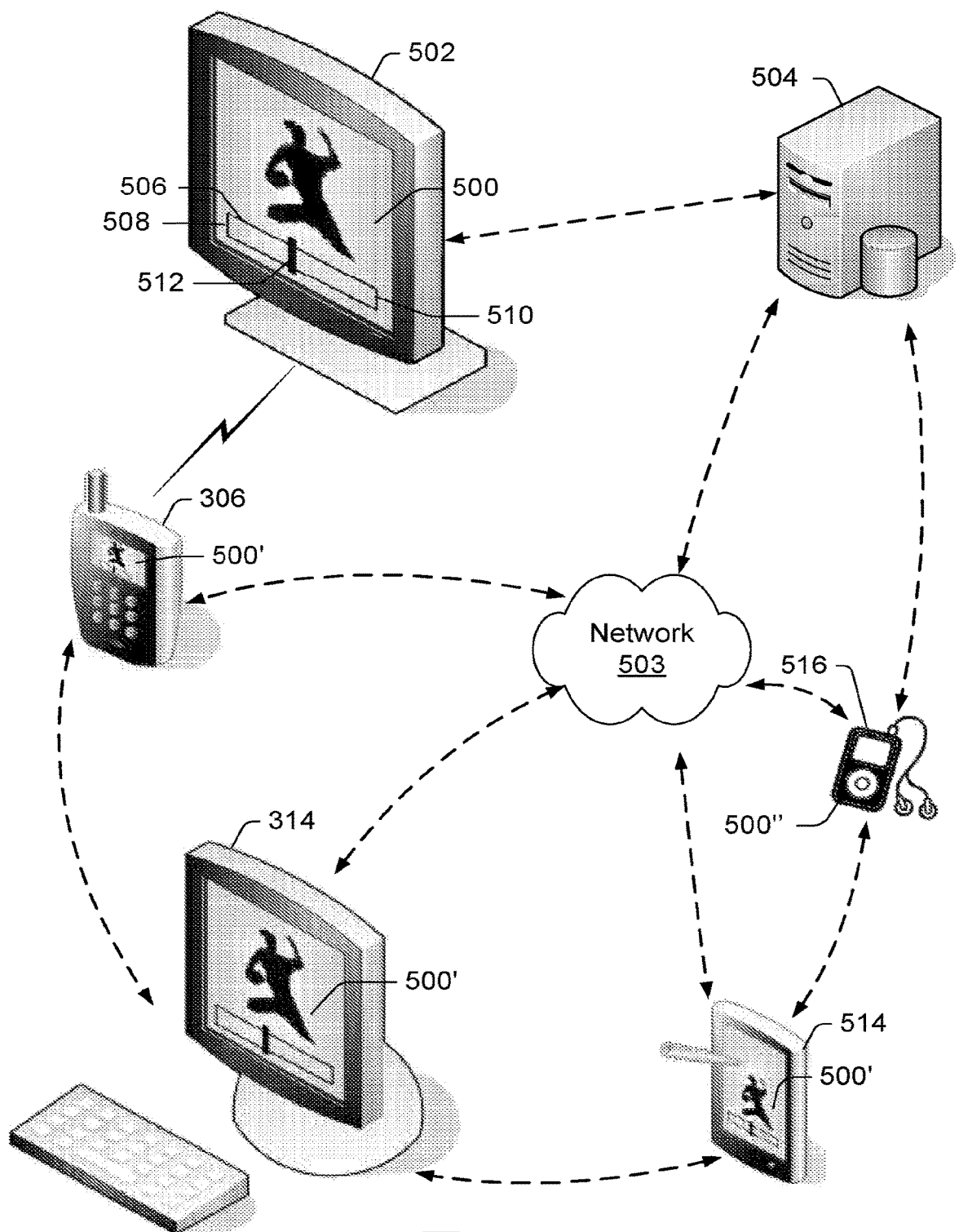
FIG. 5 shows a system for presenting a media module on a first media presentation device, creating a reference point on a reference point recordation device and sharing the reference point, or a marked media module created using the reference point, with other users or devices.

According to the example shown in FIG. 5, the media module may be a video 500 presented on a first video monitor 502, such as a monitor in an airport that presents broadcast television or video media content that is contained in, or referred to by, a data set or play list available to a user and/or the public. The user may consume the media by watching, listening and/or otherwise experiencing the video 500. The video 500 and/or an associated play list may be stored on a storage device 504. The storage device 504 may be communicatively coupled with the media presentation device 502. The media storage device 504 may also be connected to a network 503, such as the Internet, so that one or more users may obtain information related to the play list and/or the presentation of the media module 500. Additionally or alternatively, information regarding the play list and/or the presentation of the media module 500 may be made available to the user without providing access to the storage device 504.

For convenience, progression of the video in a serial fashion may be generally shown in FIG. 5 using a time lapse bar 506. A first side 508 of the bar 506 refers to the starting point of the video 500. A second side 510 of the bar 506 refers to the end point of the video 500 or to the end point of a selected portion of the video 500, such as a chapter or scene. A marked point 512 may represent the point during the presentation of the video 500 at which the user desires to resume the presentation using another media presentation device. It should be noted that the bar 506 is provided to illustrate the serial nature of the presentation of the video 500 and to show that the video 500 may have progressed to some specific point during the presentation, but that the presentation module and presentation device need not display any such time lapse bar 506.

2. Creation of a Reference Point to Mark the Media Module

While consuming the video 500 presented on the monitor 502, the user may experience an interruption or may desire to mark a point of interest. The user may or may not control the first media presentation device 502. Thus, the user may use the marking device 306 having the reference point creation module 308 to create a reference point corresponding to the mark point 512 during the presentation by recording reference information on the reference point creation module 308. More particularly, the marking device 306 may be a cellular telephone, digital wristwatch, personal media presentation device or the like. The reference point 512 may be created by voice, keystroke, or other input, such as input from an input device to instruct the reference point creation module 308 to create a reference point.

Using the cellular telephone as an example, the cellular telephone may be equipped with reference point creation software and/or hardware. The user may provide some input to designate a reference point, which may be independent of the point 512 desired to be marked by the user (hereafter "mark point"), but which may be correlated to the mark point 512. For example, the user may provide an input that creates a time stamp reference point. The user may also input relative presentation information such as the source and/or location of the presentation of the video 500 as well as other identifying information. A reference point correlation module, such as the reference point correlation module 310, may correlate the timestamp to the media presentation information in order to determine the mark point 512. The user may input the media presentation information manually using a key pad, voice recording module, or voice recognition module.

Additionally or alternatively, the marking device 306 may be capable of coupling with the media presentation device 502 through a wired or wireless coupling to obtain the relevant information regarding the video 500 or a copy of the video 500. The marking device 306 may be further operable to download the information or copy from the media presentation device 502 and/or storage device 504. The media presentation device 502 and/or storage device 504 may indicate the point during the presentation of the video 500 that the reference point was created by the user. Additionally or alternatively, the media presentation device 502 and/or storage device 504 may provide a play list or a dataset as information for correlation of the reference point to the mark point 512.

3. Creation of a Marked Media Module

The reference point correlation module 310 may allow the user to determine at what point during the presentation of the video module 500 the reference point was created. For example, if the user created a time stamp on a cellular telephone, the reference point correlation module 310 may use the time stamp together with the information collected in creating the reference point to identify the video module 500 being presented on the first media presentation device 502 and to determine the desired mark point 512. This information may be used to create a marked video module 500'.

The marked video module 500' may be created as a modified form of the original video module 500 in which the marked point 512 may be easily accessed without the user having to scan through the video module 500 to locate the marked point 512. For example, the marked media module 500' may be a copy or version of the video module 500 with the mark point 512. The modified video module 500' may have an indicator that prompts the media presentation module 312 located on the marking device 306 or other device to resume from the mark point 512. Additionally or alternatively, any unwanted portion of the video 500 may be discarded. For example, the portion already viewed and consumed by the user may be discarded or "cropped." Thus, if a user has the marking device 306, such as a cellular telephone, with the media presentation module 312, the user may use the reference point correlation module 310 to create the marked video module 500' for viewing on the device 306 starting at the mark point 512.

The marked video module 500' may instead be a marker or place identifier, which may minimize the size of the marked video module 500' by not including any content of the video module 500, but instead including the mark point 512 information for later correlation. Such a marker may be used with the original or another copy of the video module 500 to locate the mark point 512 in a subsequent presentation of the video module 500. Additionally or alternatively, the marker may be sent to a computer 314 which may be provided with the reference point correlation module 410, as shown in FIG. 4, in order to resume watching the marked video module 500' on the computer 314.

4. Storing/Sending/Accessing the Marked Media Module

The marked video module 500' may be saved on, for example, the marking device 306 or the computer 314, and made available to other media presentation devices or sent directly to another media presentation device. The marked video module 500' may be made accessible through the network 503 to a handheld device 514 or any other device capable of presenting video media. The original user or another authorized user may then retrieve and view the marked video module 500'. The operation of sending directly between two devices may be accomplished through a communication cable, such as a Universal Serial Bus (USB) cable, through a wireless connection, or other suitable communication connection.

The user or users of the devices 306, 314, 514 and other media presentation devices may search through the network 503 using a search engine to locate and access the marked video 500'. The marked video 500' may be presented together with other marked media modules so that users may choose between one or more media modules for presentation and consumption.

In the event that the marked video module 500' (or marker referring to video module 500) is made available to other users through the network 503, the user who originally consumed and created the marked video module 500' may notify one or more other users of the location and/or other identifying and descriptive characteristics of the marked video module 500' (or marker referring to video module 500). The one or more users may obtain access information to access the marked media 500'.

The marked media module 500' may additionally or alternatively be converted from one media format to another. For example, the marked video module 500' may be converted to a corresponding audio presentation module 500". Thus, a user watching the video module 500 on the monitor 502 may create a marked audio module version 500" of the video module 500 and consume the media in an audio form commencing from a point coinciding with the mark point 512 through the phone speaker or other audio output mechanism. Additionally or alternatively, the user may send the marked audio version 500" either directly or indirectly to an audio media presentation device, such as hand-held personal audio device 516. This conversion may be performed by translating the marked point 512 in the video module 500 to a corresponding point in a corresponding audio file or to the audio portion of the video module 500.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method, comprising:
sending, by a media player, a video file to a first device;
receiving, by the media player, a request to pause the sending of the video file;

inserting, by the media player, a reference point in the video file in response to the receiving the request to pause;
correlating, by the media player, the reference point to a point of presentation of the video file at the first device;
pausing, by the media player, the sending of the video file in response to the receiving of the request to pause; and
resuming the sending, by the media player, of the video file in response to a received resumption request from a second device, wherein the resuming the sending comprises continuing presentation of the video file at the first device based on the reference point.

2. The method of claim 1, further comprising determining a time associated with the request to pause.

3. The method of claim 2, wherein the pausing of the sending of the video file further comprises pausing the sending of the video file at the time associated with the request to pause and wherein the resuming the sending of the video file comprises resuming the sending of the video file at the time associated with the request to pause.

4. The method of claim 2, further comprising determining a position in the video file that is associated with the time associated with the request to pause.

5. The method of claim 4, wherein the pausing of the sending of the video file further comprises pausing the sending of the video file at the position in the video file that is associated with the time associated with the request to pause and wherein the resuming the sending of the video file comprises resuming the sending of the video file at the position in the video file that is associated with the request to pause.

6. The method of claim 1, further comprising marking a point in the video file in response to the receiving of the request to pause.

7. The method of claim 1, wherein the inserting a reference point in the video file in response to the receiving of the request to pause comprises receiving, by the media player, from a user of the first device, an indication to mark a point of the video file being presented on the first device and inserting, by the media player, a place identifier in the video file in response to the indication to mark a point.

8. A system, comprising:
a hardware processor; and
a computer readable storage medium, the computer readable storage medium storing instructions, the instructions when executed causing the hardware processor to perform operations, the operations comprising:
communicating, over a network, a video file to a first device;
receiving, over the network, a request to pause the communicating of the video file;
inserting a reference point in the video file in response to the receiving the request to pause;
correlating the reference point to a current point of presentation of the video file at the first device;
pausing the communicating of the video file in response to the receiving of the request to pause; and
resuming the communicating of the video file over the network in response to a resumption request received over the network from a second device, wherein the resuming the communicating comprises continuing presentation of the video file at the first device based on the reference point.

9. The system of claim 8, wherein the operations further comprise determining a time associated with the request to pause.

10. The system of claim 9, wherein the operations further comprise pausing the communicating of the video file at the time associated with the request to pause and wherein the resuming the communicating of the video file comprises resuming the communicating of the video file at the time associated with the request to pause.

11. The system of claim 9, wherein the operations further comprise determining a position in the video file that is associated with the time associated with the request to pause.

12. The system of claim 11, wherein the operations further comprise pausing the communicating of the video file at the position in the video file that is associated with the time associated with the request to pause and wherein the resuming the communicating of the video file comprises resuming the communicating of the video file at the position in the video file that is associated with the request to pause.

13. The system of claim 8, wherein the operations further comprise marking a point in the video file in response to the receiving of the request to pause.

14. The system of claim 8, wherein the inserting a reference point in the video file in response to the receiving of the request to pause comprises receiving from a user of the first device, an indication to mark a point of the video file being presented on the first device and inserting, responsive to the indication to mark a point, a place identifier in the video file.

15. A non-transitory computer readable storage medium which stores instructions that when executed cause a hardware processor to perform operations, the operations comprising:
sending a video file to a first device;
receiving a request to pause the sending of the video file;
inserting a reference point in the video file in response to the receiving the request to pause;
correlating the reference point to a point of presentation of the video file at the first device;
pausing the sending of the video file in response to the receiving of the request to pause; and
resuming the sending of the video file in response to receiving a resumption request requesting to resume the sending of the video file, wherein the resumption request is received from a second device, wherein the resuming the sending comprises continuing presentation of the video file at the first device based on the reference point.

16. The non-transitory computer readable storage medium of claim 15, wherein the operations further comprise determining a time associated with the request to pause.

17. The non-transitory computer readable storage medium of claim 16, wherein the operations further comprise pausing the sending of the video file at the time associated with the request to pause.

18. The non-transitory computer readable storage medium of claim 16, wherein the operations further comprise determining a position in the video file that is associated with the time associated with the request to pause.

19. The non-transitory computer readable storage medium of claim 18, wherein the operations further comprise pausing the sending of the video file at the position in the video file that is associated with the time associated with the request to pause.

20. The non-transitory computer readable storage medium of claim 15, wherein the inserting a reference point in the video file in response to the receiving of the request to pause comprises receiving from a user of the first device, an indication to mark a point of the video file being presented on the first device and inserting a time stamp in the video file in response to the indication to mark a point.

\* \* \* \* \*